US009015201B2

(12) United States Patent
McCloskey et al.

(10) Patent No.: US 9,015,201 B2
(45) Date of Patent: Apr. 21, 2015

(54) DISCRIMINATIVE CLASSIFICATION USING INDEX-BASED RANKING OF LARGE MULTIMEDIA ARCHIVES

(71) Applicant: Honeywell International Inc., Morristown, NJ (US)

(72) Inventors: Scott McCloskey, Minneapolis, MN (US); Ben A. Miller, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 172 days.

(21) Appl. No.: 13/776,356

(22) Filed: Feb. 25, 2013

(65) Prior Publication Data

US 2013/0282721 A1 Oct. 24, 2013

Related U.S. Application Data

(60) Provisional application No. 61/637,671, filed on Apr. 24, 2012.

(51) Int. Cl.
*G06F 17/30* (2006.01)
*G06K 9/62* (2006.01)

(52) U.S. Cl.
CPC ........ *G06F 17/30321* (2013.01); *G06K 9/6281* (2013.01)

(58) Field of Classification Search
USPC .......................... 707/737, 730, 736, 749, 796
See application file for complete search history.

(56) References Cited

U.S. PATENT DOCUMENTS

| | | | | |
|---|---|---|---|---|
| 6,701,318 | B2 * | 3/2004 | Fox et al. | 707/706 |
| 7,242,810 | B2 * | 7/2007 | Chang | 382/227 |
| 7,299,213 | B2 * | 11/2007 | Cristianini | 706/12 |
| 7,881,531 | B2 * | 2/2011 | Bascle et al. | 382/180 |
| 7,890,512 | B2 * | 2/2011 | Mei et al. | 707/737 |
| 7,916,658 | B2 * | 3/2011 | Balan et al. | 370/252 |
| 8,095,483 | B2 * | 1/2012 | Weston et al. | 706/12 |
| 8,194,986 | B2 * | 6/2012 | Conwell | 382/224 |
| 8,473,981 | B1 * | 6/2013 | Gargi | 725/40 |
| 2003/0033300 | A1 * | 2/2003 | Bergman et al. | 707/5 |
| 2003/0033347 | A1 * | 2/2003 | Bolle et al. | 709/107 |
| 2003/0103675 | A1 * | 6/2003 | Endo et al. | 382/229 |
| 2004/0096100 | A1 * | 5/2004 | Ii et al. | 382/159 |
| 2004/0221237 | A1 * | 11/2004 | Foote et al. | 715/700 |
| 2005/0251532 | A1 * | 11/2005 | Radhakrishnan et al. | 707/104.1 |
| 2005/0265607 | A1 * | 12/2005 | Chang | 382/224 |
| 2006/0112095 | A1 * | 5/2006 | Xie et al. | 707/5 |
| 2008/0027985 | A1 * | 1/2008 | Kasperkiewicz et al. | 707/104.1 |
| 2008/0059885 | A1 * | 3/2008 | Loui et al. | 715/723 |
| 2008/0162561 | A1 * | 7/2008 | Naphade et al. | 707/104.1 |

(Continued)

*Primary Examiner* — Cam-Linh Nguyen
(74) *Attorney, Agent, or Firm* — Brooks, Cameron & Huebsch, PLLC

(57) ABSTRACT

Devices, systems, and methods of performing feature detection on a set of multimedia files are disclosed. One method of organization includes identifying a feature from each multimedia file within the set of multimedia files wherein each file has one feature, organizing the features based on their similarities wherein similar features are grouped based upon a proximity in a feature space and a representative feature is identified for each group, receiving a detection model having one or more detection criteria the detection model having previously been trained for detection using the organized features, and using the representative features to apply the detection model in a decreasing order of detection probability in order to detect the files satisfying the detection criteria within the set of multimedia files.

19 Claims, 4 Drawing Sheets

1
0.9
0.8
0.7
0.6
0.5
0.4
0.3
0.2
0.1
0
0 500 1000 1500 2000 2500 3000 3500 4000 4500 5000

(56) References Cited

U.S. PATENT DOCUMENTS

2009/0070329 A1* 3/2009 Ma et al. ........................... 707/6
2009/0083010 A1* 3/2009 Qi et al. ............................ 703/2
2012/0004716 A1* 1/2012 Langhammer et al. ....... 607/148

* cited by examiner

DISCRIMINATIVE CLASSIFICATION USING INDEX-BASED RANKING OF LARGE MULTIMEDIA ARCHIVES

GOVERNMENT RIGHTS

The subject matter of this disclosure may have been made with government support. Accordingly, the US Government may have certain rights to subject matter disclosed herein.

TECHNICAL FIELD

The present disclosure relates to multimedia archive searching.

BACKGROUND

There has been an increasing proliferation of multimedia data, such as video data (e.g. from surveillance cameras). This data can be stored in large data storage structures or disbursed over multiple data storage structures and can be difficult to sort through to find relevant data in these types of large multimedia archives.

Because the relevant data is vastly outnumbered by irrelevant data, naive, searching over the multimedia archive can be extremely inefficient. In order to avoid re-processing the video data each time the archive is queried, systems usually extract a set of features representing interesting aspects (human activity, objects, etc.) of the multimedia file. These features may, for example, be divided into classes for files with common aspects and stored in an index, which provides fast search for near neighbors of a given query feature.

However, nearest neighbor-type searching often fails to provide matching accuracy when features do not cleanly separate these classes. In order to improve accuracy, people often use discriminative classifiers (i.e., Support Vector Machines (SVM)) to probabilistically label features with respect to the classes. Unfortunately, such classifiers often times do not easily lend themselves to indexing, and applying them to large datasets is slow.

DETAILED DESCRIPTION

Figure 1A:
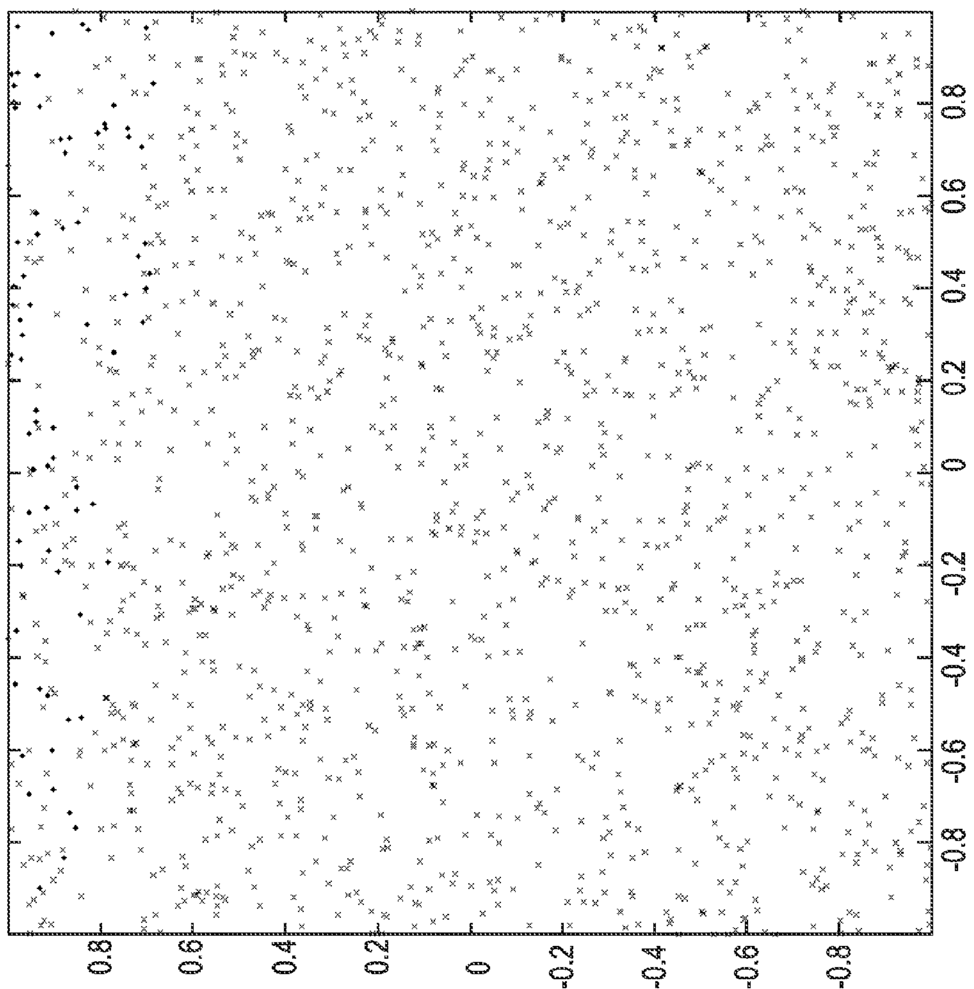
FIG. 1A illustrates an example of a visualization of classification of a training sample of multimedia files in accordance with one or more embodiments of the present disclosure.

Methods, devices, and systems for searching using index-based ranking of large multimedia archives are described herein. Embodiments of the present disclosure can accelerate the evaluation of a discriminative classifier on a large archive of features, using an index in a unique way to provide improved searching performance.

Embodiments of the present disclosure can accelerate archive labeling with a discriminative classifier by exploiting locality in the underlying feature space. While few near neighbors of a feature illustrating a certain class (e.g., a person seen digging in a video) may represent that same class, the converse can hold. For example, features representing the same class tend to be near one another. As such, the feature organization provided by a system such as a metric-based indexing system can support rapid exploration of relevant parts of the feature space.

One feature of the embodiments of the present disclosure can be that the concept provides priority-based classification of a feature archive, where features likely to be positively identified by a discriminative classifier are analyzed first. As such, the amount of time needed to retrieve the top N representatives of a certain class is greatly reduced.

For example, an embodiment includes an indexing function, wherein indexing refers to the process by which features are organized, by selecting pivot points, etc. This process utilizes only the features themselves and, in particular, does not depend on having any labels associated with the source files (e.g., video clips). Some embodiments, also include training, wherein training refers to the process by which labels given for certain source files (e.g., video clips) are used to learn a discriminative classifier. This classifier can later be used to generate a probabilistic estimate that any clip contains a given semantic concept.

In terms of the order of operations, indexing is typically performed first. Then, one or more classifiers may be trained. Once trained, a priority queue-based search can be applied to accelerate the application of the classifier to some or all of the data in the index.

As indicated above, some embodiments of the present disclosure can utilize an index mechanism that hierarchically groups the features, and that hierarchy is represented by an organizational tree (e.g., a binary tree) where features are assigned to a location within the tree based on proximity to representative points. As such, all nodes in the tree have a representative feature (called a “pivot point” herein), and leaf nodes additionally contain several additional features.

Also, as discussed above, embodiments of the present disclosure allow for a search of the tree in an order determined by one or more scores (e.g., given by the discriminative classifier) estimated on each of the pivot points. At the base of the tree, a feature is selected that can be classified into more than one feature type (e.g., natural or man-made). This selection point would be a pivot point defining two or more branches of the tree based upon the number of possible feature types that can be defined for the data. When the search is processed the feature type with the higher score determines which branch of the tree will be explored first. The search is done recursively, with new representative points being added to a priority queue (a standard data structure) based on their classifier scores. When a leaf node is reached, the additional features are classified.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of users" can refer to one or more users. Also, as used herein, the identifier "N" is used to mean any number.

FIG. 1A illustrates an example of a visualization of classification of a training sample of multimedia files in accordance with one or more embodiments of the present disclosure. Multimedia files have several features that can be used to differentiate one file from another and these features can thereby be used to classify the files. Some suitable features include, but are not limited to, motion of objects, characteristics of the size and/or shapes of objects, gist features representing scene texture, and audio features, among others.

In some embodiments, a system can define a tree organizational structure of representative data points to be utilized for searching the archive. Separately, the system may be presented data that can be classified into multiple groups (e.g., two groups as shown in FIG. 1A). For example, data may be presented that can be classified based on a video scene that is taken in a natural or man-made setting.

This can, for example, be surmised based on the textures of one or more objects shown in the video. These classifications can be used to discriminate the data into a number of classes and sub classes based on the characterization of the data. An index can use this classified information to search the files for others likely to be the same class and may increase the speed of finding all examples of that class in the archive.

The example illustrated in FIG. 1A is a training example based upon two semantic concepts (e.g., natural or man-made texture). Real-world multimedia features generally reside in much higher dimensional spaces, where data and its organization can be very complex. However, the understanding of the general principles of the present disclosure, a two dimensional example is being provided. Such an example should be viewed as instructive and should not be viewed as limiting.

In the comparison of the data points in the feature any suitable method can be utilized. For example, the data can be indexed based upon Euclidean distance between two data points, with the closeness providing the basis for the grouping inherent in the indexing structure illustrated in FIG. 1B with the group representative points marked in the feature space.

In the example of FIG. 1A, the y-axis is a dimension that represents a semantic concept of a feature that is to be classified. The x-axis is a dimension that represents another semantic concept of a feature (here we only have two features, so there are two axes, but some embodiments may have many dimensions and therefore representation of the data would be a more complex multi-axis presentation.

If the probability is high that the file contains all of the target semantic concept and none of the other semantic concept, then it will be positioned in the left side of the illustrated example. If the probability is high that the file contains none of the target semantic concept and all of the other semantic concept, then it will be positioned in the right side of the illustrated example. The data points in between these two extremes have probabilities based on a mix of semantic concepts with the file (e.g., a video scene having both buildings and grass would have a probability falling somewhere in the middle).

In some embodiments, the system can use the tree based upon one or more features or one or more semantic concepts. For example, the probabilities of a group of semantic concepts could be combined for each file to provide a composite probability and the files can be prioritized for search purposes based upon comparison of the composite probability. Additionally, in some embodiments, some probabilities may be weighted more heavily than others based upon their importance in the targeted search.

In such embodiments, the indexing can be done by recursively reviewing the data based on different characteristics (e.g., natural/man-made) of the features in the data (e.g., texture). This tree structure created by the indexing process can be utilized to create an analysis path (branch of the tree) where the base pivot point and leaf points are individual multimedia files or groups of files to be identified by a particular search for many different semantic concepts based on the same feature.

In such a process, each multimedia file is analyzed to determine a probability that the file contains the particular semantic concept. For example, in the illustration of FIG. 1A, the data shown by dots represents data that has a higher probability that it contains the particular semantic concept.

In the illustrated embodiment, the closer to the top of the illustration that a data point is positioned, the higher the probability that it contains the semantic concept. The data points indicated by X's have a lower probability that they contain the semantic concept. In FIG. 1A, the amount of likely data points having the semantic concept is relatively small in comparison to the total data set this is to model the multimedia archive case where the archive contains many different classes and therefore very few examples of any one given class.

Based on this structure, the system can determine that it would be advantageous to search the files represented by these data points first to obtain the quickest positive result of a search. In some embodiments, the files represented by the dot type data points can be selected for searching or a threshold can be established where data files having a certain probability or higher could be searched. Any suitable threshold can be utilized that will provide an advantage to search capability. Such methodologies can significantly increase search speed.

Figure 1B:
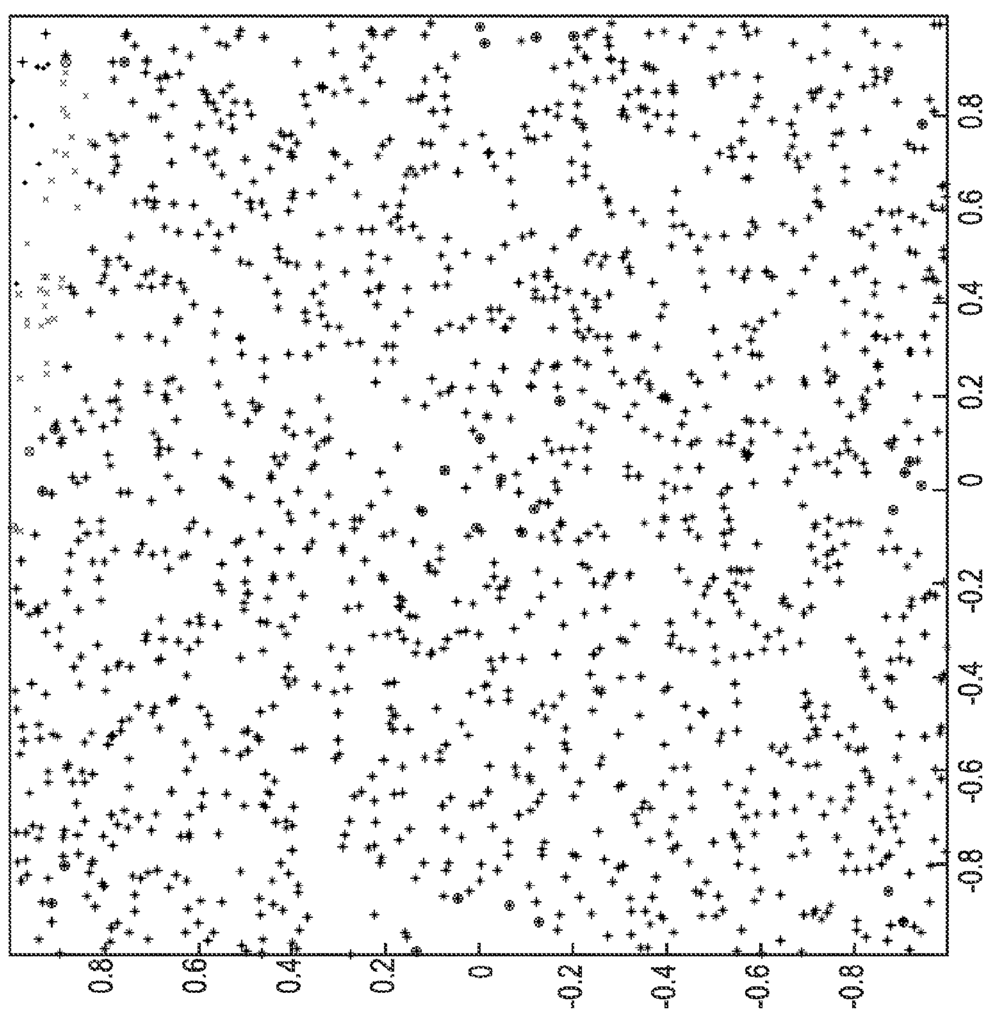
FIG. 1B illustrates an example of a visualization of classification of multimedia files in accordance with one or more embodiments of the present disclosure.

FIG. 1B illustrates an example of a visualization of classification of multimedia files in accordance with one or more embodiments of the present disclosure. In this visualization, a data set like that of FIG. 1A has been analyzed by the indexed system. In this embodiment, those data points with the high probability are shown with dots, those with a probability below a threshold are shown with asterisks, and those with a probability near the threshold are shown with X's.

The visualization of FIG. 1B also illustrates the locations of internal pivot points with plusses and leaf pivot points as circles. These locations illustrate the spread of the pivot points over the entire feature space.

The system can use these pivot points to organize it exploration of the feature space for a certain category. A search through the tree structure of pivot points which selects the highest probability child pivot point of the tree searched so far as the next to categorize is one way to reduce the amount of data points categorized while still finding all the positive data points.

Figure 2:
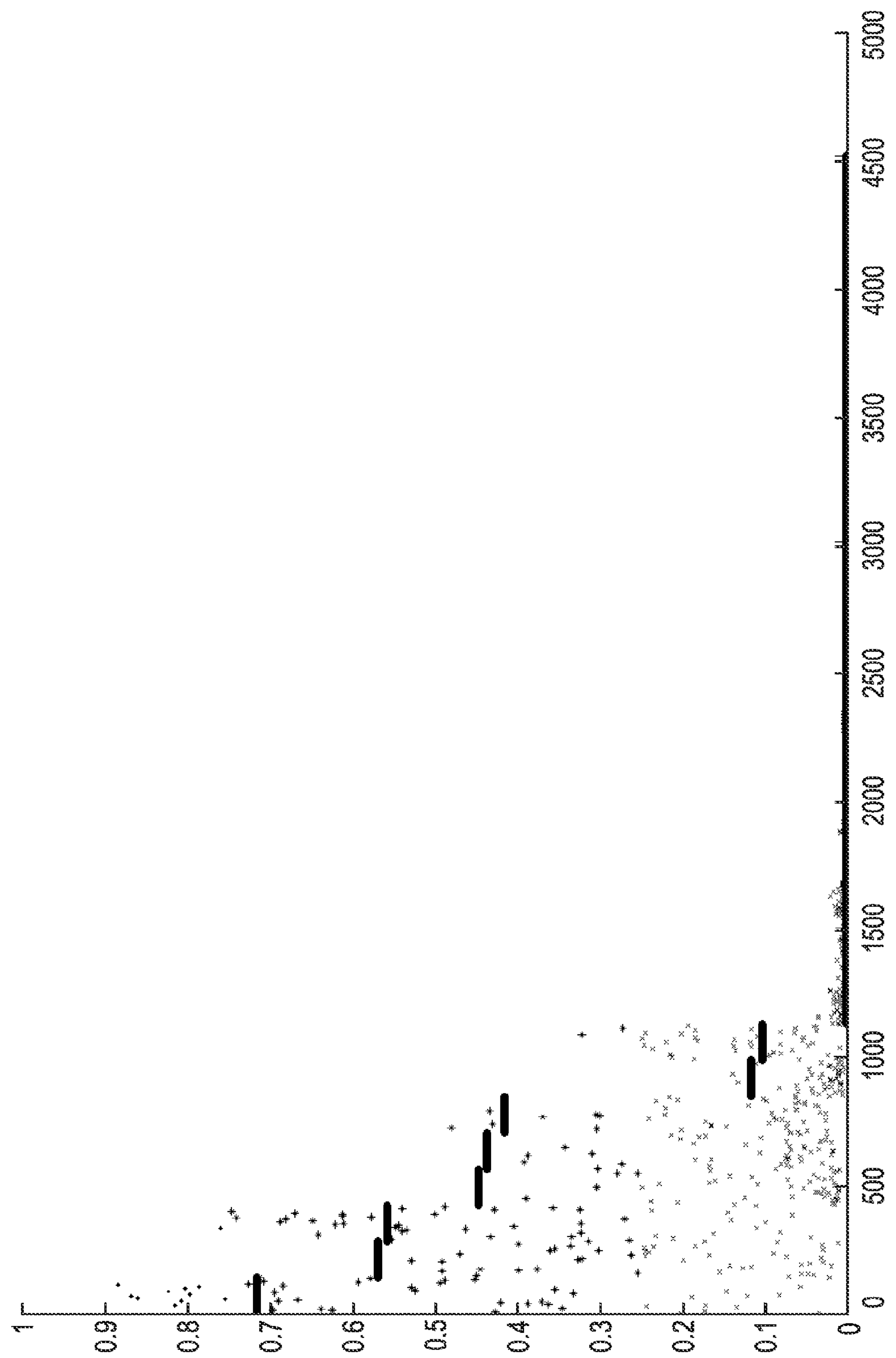
FIG. 2 illustrates another visualization of a classification of multimedia files including pivot point data in accordance with one or more embodiments of the present disclosure.

FIG. 2 illustrates another visualization of a classification of multimedia files including pivot point data in accordance with one or more embodiments of the present disclosure. The graph provides the probability that a target subject matter (e.g., a composite probability) is in the file represented by the data point along the y-axis. The x-axis represents the order in which the corresponding file was visited by the embodiment of the present disclosure. In this example, the system succeeds in classifying the high-probability clips before exhaustively classifying those clips with low probability.

In this representation, the high probability points are illustrated with dots and the low probability points are illustrated in with X's with those near the threshold shown with asterisks. Also shown in this embodiment are the pivot points shown with circles. In this example, it can be seen that based upon the pivot points used in the analysis for prioritization of the files, the results associated with those pivot points may provide a better search result if the pivot points have a higher probability.

Figure 3:
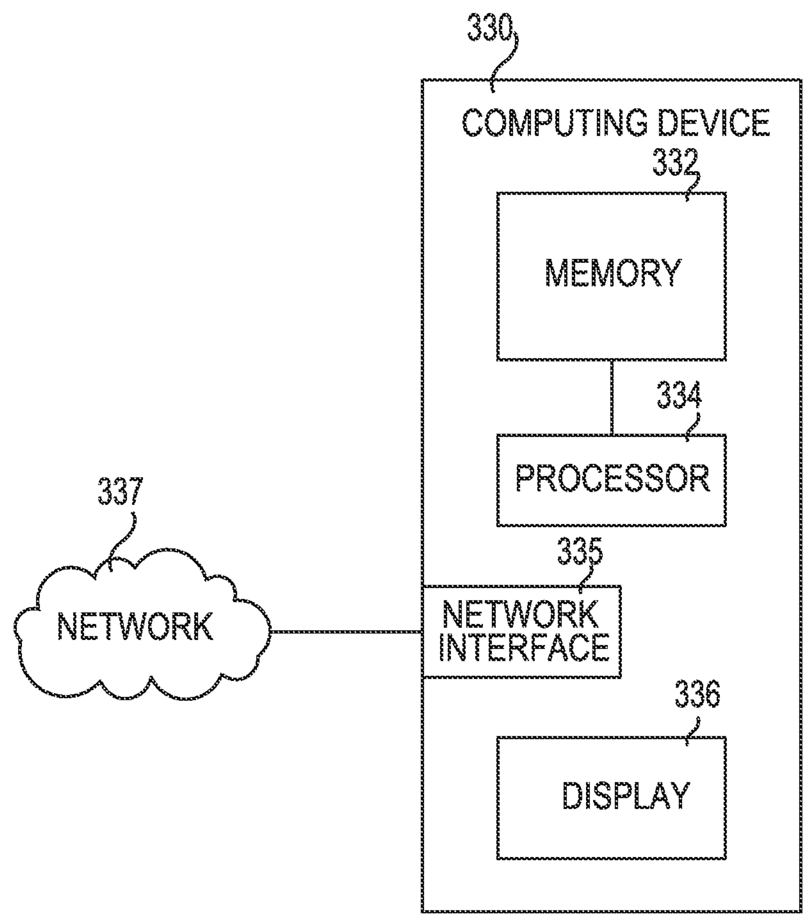
FIG. 3 illustrates a computing device that can be utilized with one or more embodiments of the present disclosure.

FIG. 3 illustrates a computing device that can be utilized with one or more embodiments of the present disclosure. Computing device 330 can be, for example, a laptop computer, a desktop computer, or a mobile device (e.g., a mobile phone, a personal digital assistant, etc.), among other types of computing devices.

As shown in FIG. 3, computing device 330 can include a memory 332 and a processor 334 coupled to memory 332. Memory 332 can be any type of storage medium that can be accessed by processor 334 to perform various examples of the present disclosure. For example, memory 332 can be a non-transitory computing device readable medium having computing device readable instructions (e.g., computing device program instructions) and data stored thereon. The computing device readable instructions are executable by processor 334 to perform various examples of the present disclosure. The data can be used (e.g., analyzed by) the computing device readable instructions during their execution.

Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 332 is illustrated as being located in computing device 330, embodiments of the present disclosure are not so limited. For example, memory 332 can, in addition to or alternatively, be located internal to another computing resource (e.g., enabling computer readable instructions to be downloaded over the Internet or another wired or wireless connection).

As shown in FIG. 3, computing device 330 includes a network interface 335. Network interface 335 can connect computing device to a network, such as network 337 illustrated in FIG. 3.

Network 337 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 337) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 337 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 3, computing device 330 also includes a display 336. Display 336 can include, for example, a screen that can provide (e.g., display and/or present) information to a user of computing device 330.

Additionally, computing device 330 can receive information from the user of computing device 330 through an interaction with the user via display 336. For example, computing device 330 can receive input from the user via display 336 (e.g., a touch screen display or via another user input device such as a keyboard in response to interaction with items show on the display). For example, the user can enter the input into computing device 330 using, for instance, a mouse and/or keyboard associated with computing device 330 (e.g., display 336).

As discussed herein the present disclosure includes a number of device, systems, and methods for performing feature detection on a set of multimedia files. For example, in one method embodiment, the method includes identifying a feature from each multimedia file within the set of multimedia files wherein each file has one feature, organizing the features based on their similarities wherein similar features are grouped based upon a proximity in a feature space and a representative feature is identified for each group, receiving a detection model having one or more detection criteria the detection model having previously been trained for detection using the organized features, and using the representative features to apply the detection model in a decreasing order of detection probability in order to detect the files satisfying the detection criteria within the set of multimedia files.

In some embodiments, the method includes wherein receiving a detection model is accomplished by receiving a support vector machine. A support vector machine can for example be a support vector machine with a kernel type selected from the group including a linear, Chi squared, histogram intersection, and radial basis function, among other suitable types.

In various embodiments, the indexing method can be any suitable method for accomplishing the organizing features. For example, organizing the features can include utilizing an indexing method selected from the group including: a metric tree, hierarchical k-means, kd-tree, and locality-sensitive hashing.

In some embodiments, an indexing method can use the representative features to apply the detection model in conjunction with a priority queue to order the groups represented by the representative features selected during feature organization. In such embodiments, the priority queue can be utilized with any suitable indexing method.

Method embodiments can also include receiving a detection model having one or more detection criteria having detection criteria indicating a presence of at least one of: an event, a being behavior, an object behavior, an object, and a being within the multimedia file, among other suitable criteria that can be utilized.

Additionally, in some embodiments, the feature identified from each multimedia file can be from the group of features including: a characteristic of a size of an object, a characteristic of a shape of an object, number of objects present, a characteristic brightness, a gist feature representing a scene texture, spatial temporal histogram oriented gradient, and an feature identified from audio, among other suitable criteria that can be utilized. Some methods can use such criteria for both the detection criteria and feature selection and in some embodiments, as discussed above, detection criteria and feature selection criteria can be different.

In another method embodiment, the method includes identifying a feature from each multimedia file within the set of multimedia files, grouping the features based upon a proximity to other features in a feature space, identifying a representative feature for each group, receiving a detection model having one or more detection criteria, the detection model having previously been trained for detection of criteria by utilizing the organized features, and applying the detection model in a decreasing order of detection probability in order to detect the files satisfying the detection criteria within the set of multimedia files based on their proximity to the representative features.

Applying the detection model can include providing a probability value for each feature with respect to all other features of the set of multimedia files, in some embodiments. Applying the detection model can provide a probability value for each feature in the set of multimedia files. In some such embodiments, the highest probability value features are presented to a user first. In this manner, those results that are most likely to be relevant are presented first and therefore, the user may find that file they are looking for more quickly.

In various embodiments, a user can define the received detection model. In this manner, a user can create the parameters for the detection of features within the set of multimedia files.

In some embodiments, applying the detection model can be accomplished by recursively applying the detection model to smaller subsets of the set of multimedia files based upon selection of a representative feature. In this manner, for example, the most likely files can be detected first as the detection model is recursively applied to smaller subsets.

Method embodiments can include applying the detection model in which a time threshold is applied to the application of the detection model such that results generated from the model up to the time threshold are presented to a user. In this manner, the user can review results while the detection model is still attempting to detect relevant files. For example, in some such embodiments, the method may include applying a time threshold to the application of the detection model such that results generated from the model up to the time threshold are presented to a user and the user may view the results while the detection model continues to be applied to the files in order to detect files satisfying the detection criteria within the set of multimedia files based on their proximity to the representative features but not analyzed prior to the occurrence of the time threshold.

In another embodiment, a multimedia organization system includes a processor and memory in communication with the processor wherein the memory includes machine executable instructions stored in the memory and executable on the processor to allow the organization and identification of features of multimedia files within a feature space wherein the searching mechanism includes searching the feature space based upon a proximity of a feature of a particular multimedia file to a representative feature in the feature space.

As discussed with respect to other embodiments above, in some embodiments, the searching mechanism can include a detection model that is applied in a decreasing order of detection probability in order to detect the files satisfying the detection criteria within the set of multimedia files based on their proximity to the representative features.

The detection model can be applied to each feature of the set of multimedia files and a probability value can be generated for each feature. The probability value can be utilized, for example, to determine how relevant a multimedia file will be to the detection criteria provided by a user.

When a search is processed, one feature of the file can be compared with two or more features of files within the database and the file can be given a score with respect to that feature. The score can then be compared to feature scores of other files in the database to determine its closeness to those other files.

In some embodiments, a weighting factor can be utilized. For example, a detection criterion can be weighted more heavily or less heavily based on an importance factor assigned to the criterion. This can allow for searching of a file that has multiple items of interest in the file, but where one item may be the main subject of a file. For example, the user may desire to see videos of types of hockey shots. A weight could be applied to hockey so that the results are more heavily weighted toward hockey than types of shots that may exist in the set of multimedia files.

In various embodiments, a first multimedia file can include multiple features and wherein a composite proximity index location can be calculated based on a proximity of each feature of the first file to one or more representative features. For example, the first file may include multiple features and that may be important to the closeness of the file to the user's request. Accordingly, by taking into account the proximity of multiple features to one or more representative features, the result may be more accurate. For instance, the proximity values of each feature of the first file could be averaged to find a suitable composite value for the first file. Any suitable methodology for selecting a file having multiple features of interest can be utilized within the scope of the present embodiments.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of performing detection over a set of multimedia files, comprising:

identifying a feature from each multimedia file within the set of multimedia files using a computing device wherein each file has one feature;

organizing, by the computing device, the features based on their similarities wherein similar features are grouped based upon a proximity in a feature space and a representative feature is identified for each group;

receiving, by the computing device, a detection model having one or more detection criteria the detection model having previously been trained for detection using the organized features; and using the representative features by the computing device to apply the detection model in a decreasing order of detection probability in order to detect the files satisfying the detection criteria within the set of multimedia files, wherein the detection probability is determined based on a likelihood of the organized features of being positively identified by a discriminative classifier.

2. The method of claim 1, wherein receiving a detection model is accomplished by receiving a support vector machine.

3. The method of claim 1, wherein receiving a detection model is accomplished by receiving a support vector machine with a kernel type selected from the group including a linear, Chi squared, histogram intersection, and radial basis function.

4. The method of claim 1, wherein organizing the features includes utilizing an indexing method selected from the group including: a metric tree, hierarchical k-means, kd-tree, and locality-sensitive hashing.

5. The method of claim 1, wherein organizing the features includes utilizing an indexing method and using the representative features to apply the detection model includes utilizing a priority queue to order the groups represented by the representative features selected during feature organization.

6. The method of claim 1, wherein receiving a detection model having one or more detection criteria includes detection criteria indicating a presence of at least one of: an event, a being behavior, an object behavior, an object, and a being within the multimedia file.

7. The method of claim 1, wherein the feature identified from each multimedia file is from the group of features including: a characteristic of a size of an object, a characteristic of a shape of an object, number of objects present, a characteristic brightness, a gist feature representing a scene texture, spatial temporal histogram oriented gradient, and a feature identified from audio.

8. A non-transitory computer readable medium having computer readable instructions stored thereon that are executable by a processor to:

identify a feature from each multimedia file within the set of multimedia files;

group the features based upon a proximity to other features in a feature space; and identify a representative feature for each group;

receive a detection model having one or more detection criteria, the detection model having previously been trained for detection of criteria by utilizing the organized features; and apply the detection model in a decreasing order of detection probability in order to detect the files satisfying the detection criteria within the set of multimedia files based on their proximity to the representative features, wherein the detection probability is determined based on a likelihood of the organized features of being positively identified by a discriminative classifier.

9. The method of claim 8, wherein applying the detection model includes providing a probability value for each feature with respect to all other features of the set of multimedia files.

10. The method of claim 8, wherein applying the detection model provides a probability value for each feature in the set of multimedia files and wherein the highest probability value features are presented to a user first.

11. The method of claim 10, wherein receiving a detection model includes receiving a user defined detection model.

12. The method of claim 8, wherein applying the detection model includes recursively applying the detection model to smaller subsets of the set of multimedia files based upon selection of a representative feature.

13. The method of claim 8, wherein applying the detection model includes applying a time threshold to the application of the detection model such that results generated from the model up to the time threshold are presented to a user.

14. The method of claim 8, wherein applying the detection model includes applying a time threshold to the application of the detection model such that results generated from the model up to the time threshold are presented to a user and the user may view the results while the detection model continues to be applied to the files in order to detect files satisfying the detection criteria within the set of multimedia files based on their proximity to the representative features but not analyzed prior to the occurrence of the time threshold.

15. A multimedia organization system, comprising:

a processor; and memory in communication with the processor wherein the memory includes machine executable instructions stored in the memory and executable on the processor to:

allow organization and identification of features of multimedia files within a feature space wherein a searching mechanism includes searching the feature space based upon a proximity of a feature of a particular multimedia file to a representative feature in the feature space, wherein the searching mechanism includes a detection model that is applied in a decreasing order of detection probability in order to detect files satisfying a plurality of detection criteria within the set of multimedia files based on their proximity to the representative features, and wherein the detection probability is determined based on a likelihood of the organized features of being positively identified by a discriminative classifier.

16. The system of claim 15, wherein the detection model is applied to each feature of the set of multimedia files and a probability value is generated for each feature and wherein the probability value is utilized to determine how relevant a multimedia file will be to the detection criteria provided by a user.

17. The system of claim 15, wherein when a search is processed, one feature of the file is compared with two or more features of files within the database and the file is given a score with respect to that feature, the score can then be compared to feature scores of other files in the database to determine its closeness to those other files.

18. The system of claim 15, wherein a detection criterion can be weighted more heavily or less heavily based on an importance factor assigned to the criterion.

19. The method of claim 15, wherein a first multimedia file includes multiple features and wherein a composite proximity index location is calculated based on a proximity of each feature of the first file to one or more representative features.

* * * * *